Figure 1:
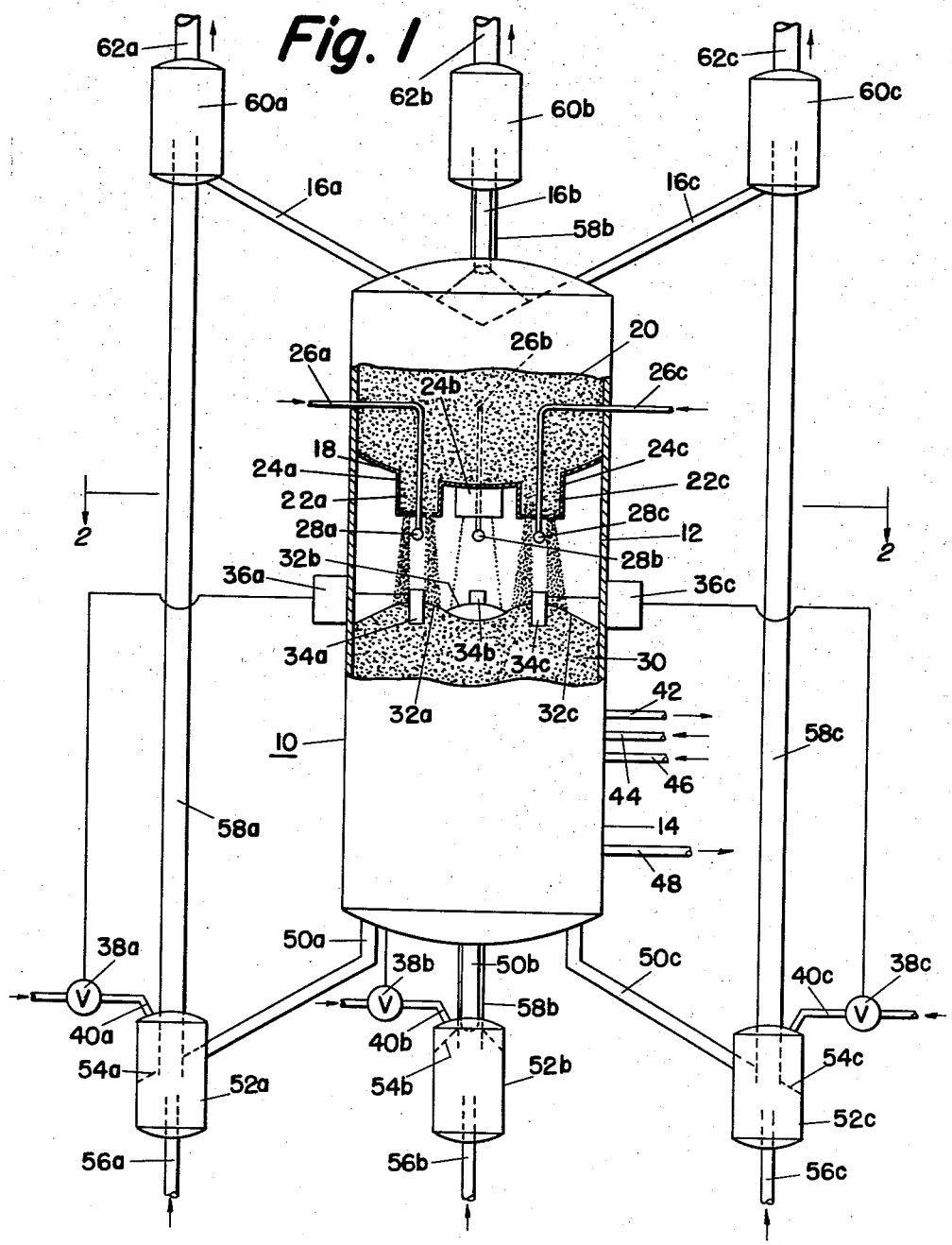

Sept. 13, 1960 W. L. McCLURE 2,952,623
CONTROLLING FLOW OF GRANULAR SOLIDS
Filed April 30, 1958 2 Sheets-Sheet 1

INVENTOR.
WILLIAM L. MC CLURE
BY Robert O. Spindle
ATTORNEY

Sept. 13, 1960 W. L. McCLURE 2,952,623
CONTROLLING FLOW OF GRANULAR SOLIDS
Filed April 30, 1958 2 Sheets-Sheet 2

INVENTOR.
WILLIAM L. MC CLURE
BY
Robert D. Spindle
ATTORNEY

United States Patent Office 2,952,623
Patented Sept. 13, 1960

2,952,623

CONTROLLING FLOW OF GRANULAR SOLIDS

William L. McClure, Toledo, Ohio, assignor to Sun Oil Company, Philadelphia, Pa., a corporation of New Jersey Filed Apr. 30, 1958, Ser. No. 732,083

6 Claims. (Cl. 208—167)

This invention relates to process and apparatus for controlling the flow of granular solids through process equipment, and more particularly to process and apparatus for controlling the level of the upper surface of a compact bed of granular solids fed from above by a falling stream of solids.

The invention is particularly useful as applied to processes for conversion of petroleum hydrocarbons by contact with granular conversion-supporting solid materials such as catalysts or heat transfer materials. Such processes are generally well known in the art as applied to conversions such as the cracking of relatively high molecular weight petroleum hydrocarbons to produce gasoline, reforming processes, hydrodesulfurization processes, etc.

The invention relates to those processes wherein a compact bed of granular, conversion-supporting solids is passed downwardly by gravity through a reaction vessel, and wherein the upper surface of the bed is fed by a plurality of falling streams of granular solids, which streams are distributed over the cross section of the reaction vessel in a uniform manner. A liquid hydrocarbon charge is introduced into contact with the falling solids in order to vaporize the liquid. The use of a plurality of such falling streams is beneficial in that it provides better distribution of the granular solids over the cross section of the reactor than can be obtained when a single falling stream is employed.

A difficulty which arises however when a plurality of falling streams is employed is that there is a tendency for the level of the compact bed beneath the falling streams to vary in different portions of the cross section of the reactor. In the prior art, means have been proposed for correcting such variations in level by changing the rate of solids flow through one of the falling streams in order to change the bed level beneath that stream. Such operation has disadvantages, however, in that it alters the ratio of solid material to liquid material in the initial contacting of the liquid with the granular solids. This frequently has undesirable effects with respect to the vaporization and conversion of the liquid charge material.

The present invention overcomes the disadvantages of the prior art by providing means for regulating the level of the upper surface of the compact bed while minimizing any changes in the rate of solids flow in the falling stream. The invention utilizes a plurality of lift conduits for elevating the granular solids to a suitably high position after they have passed downwardly through the reaction vessel and usually also through a regeneration vessel beneath the reaction vessel. The use of a plurality of lift conduits is a known feature of processes utilizing granular conversion-supporting solids in hydrocarbon conversion processes, for example, and has advantages as recognized in the art over the use of a single lift conduit for this purpose. The invention, however, provides an additional advantage and function of using a plurality of lift conduits, and provides this advantage and function by using the plurality of lift conduits in a particular manner not previously known in the art.

According to the invention, the lift conduits and the falling solids streams in the reactor are spaced around the cross section of the apparatus assembly in any suitable pattern such that, for each falling stream or set of falling streams, there is a corresponding lift conduit or set of lift conduits in the same sector of the apparatus assembly. By changing the rate of flow of solids through one of the lift conduits or one set of lift conduits, the level of the compact bed beneath the falling stream or set of falling streams in the same sector of the apparatus assembly is changed to a greater extent than the level beneath the other falling streams is changed. Therefore, by such change in the rate of flow through the lift conduit, the bed level can be adjusted in a desired manner in different sectors of the reactor.

The functions according to the invention are made possible by the fact that the effect of the changed rate of flow through the lift conduit extends throughout the entire portion of the downflow path between the upper surface of the compact bed in the reactor and the engager vessel from which solids are introduced into the lift conduit, and further by the fact that this effect is greater throughout that portion of the downflow path in the sector in which the lifting rate is changed than it is in the other sectors.

Figure 2:
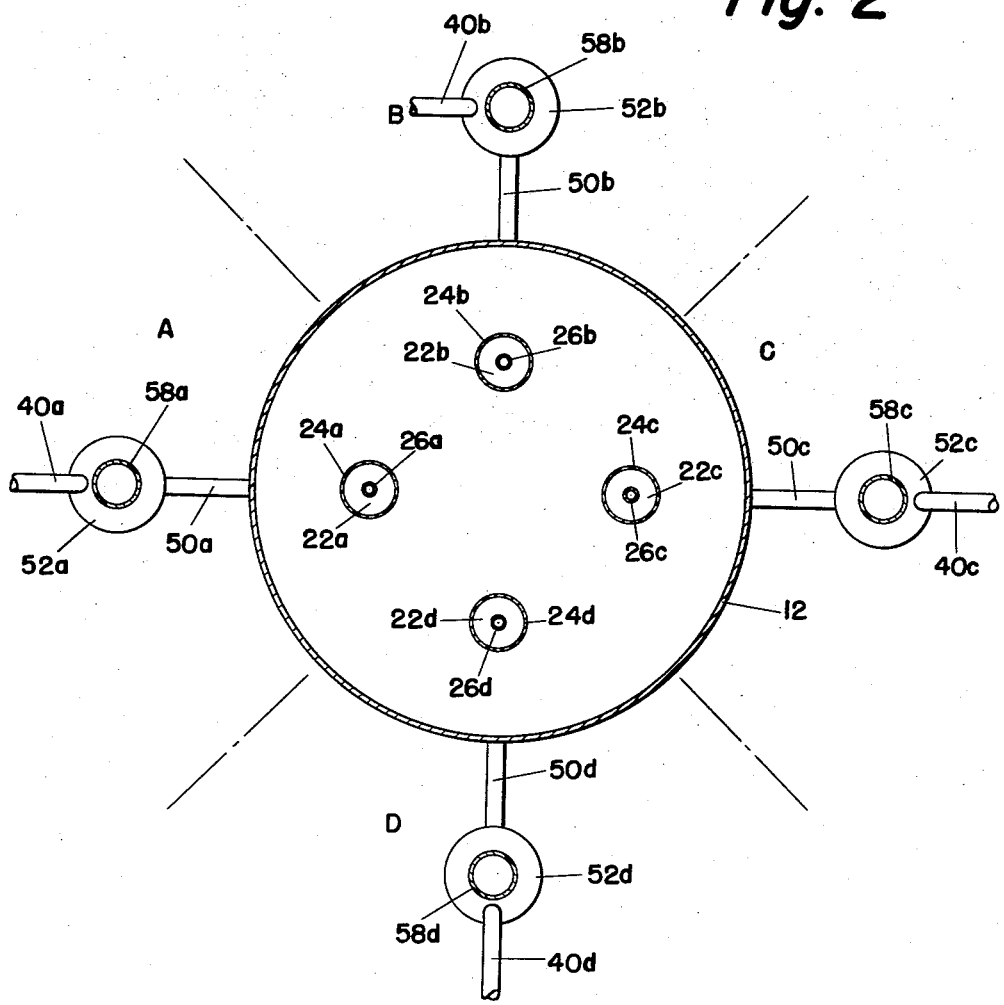

The invention will be further described with reference to the attached drawings wherein Figures 1 and 2 are elevational and plan views respectively of an apparatus assembly according to the invention.

Referring to the drawing, 10 represents a combined reactor and regenerator vessel for use in cracking of petroleum hydrocarbons to gasoline by contact with a granular catalyst, for example synthetic silica-alumina catalyst having average particle size for example of about 6 mesh. 12 represents the reactor portion of the vessel and 14 the regenerator portion. Also shown in the drawing are engager vessels 52a, 52b, etc., lift conduits 58a, 58b, etc., and disengager vessels 60a, 60b, etc. Within reactor portion 12, a transverse partition 18 provides a space thereabove into which the catalyst is introduced prior to passage through the falling streams beneath the partition. Secured within apertures in the partition are a plurality of sleeves 24a, 24b, etc., which are spaced around the cross section of the reactor in the manner illustrated in Figure 2. Associated with each sleeve 24 is a conduit 26a, 26b, etc. for introduction of liquid hydrocarbon feed into the reactor. A nozzle 28a, 28b, etc., is provided at the lower end of each of the conduits 26.

The sleeves 24, conduits 26 and nozzles 28 constitute assemblies for introduction of liquid hydrocarbons into the apparatus and for providing an annular falling stream of catalyst surrounding the point of introduction of the liquid feed. Such assemblies are illustrated schematically in the drawing since they are known in the art, and detailed disclosures of the construction of such assemblies can be found in various publications. Any suitable known assembly can be employed, for example the assembly disclosed in W. A. Hagerbaumer U.S. Patent No. 2,458,162, January 4, 1949, or any other suitable known assembly.

Beneath the sleeves 24 in each of the four quadrants A, B, C and D of the apparatus, are located level detecting means 34a, 34b, etc. Associated with each level detecting means 34 are a level indicator 36a, 36c, etc. and means adapted to transmit impulses generated by the level detecting means to the valves 38a, 38b, etc., as subsequently more fully described. Any suitable level detecting means and associated apparatus can be employed, such for example as those shown in the above patent.

In operation, granular solids are passed downwardly by gravity as compact masses through each of the conduits 16a, 16b, etc., into the upper portion of the reactor 12 wherein they form a compact mass which flows downwardly through the catalyst annuli 22a, 22c, etc., between the sleeves 24 and the liquid feed conduits 26. As the catalyst passes downwardly through the annular orifices at the lower ends of the sleeves 24, it forms a falling annular curtain of catalyst. Liquid hydrocarbons are introduced through each of the conduits 26 and nozzles 28, and are directed laterally into the falling catalyst curtain. The hydrocarbons are vaporized, and the vapors are passed downwardly through the compact bed 30 and undergo conversion to form lower boiling hydrocarbons. If desired, hydrocarbons in vapor phase can also be introduced into the apparatus by means not shown between partition 18 and the upper surface of the bed 30. These hydrocarbon vapors pass downwardly through the bed 30 together with the vapors evolved from the liquid feed.

The upper surface of the bed 30 at locations beneath the sleeves 24 is indicated by the numerals 32a, 32b, etc. When for any reason the level under one of the sleeves 24, e.g. sleeve 24a, becomes lower than a predetermined level, a signal from the level detecting means 34a beneath that sleeve is transmitted to the valve 38a which controls the rate of introduction of a gas such as flue gas, air or steam through line 40a into engager 52a. This decrease in the rate of introduction results in a decrease in the pressure above the upper surface 54a of the bed of solids in engager 52a from which the solids are introduced into lift conduit 58a. Since the rate of introduction of solids into the lift conduit is directly proportional to the pressure above the bed surface 54a, the decrease in pressure results in a decrease in the rate of introduction of solids into the lift conduit and a decrease in the rate of flow of solids through the lift conduit. This decrease in rate results in a decrease in the rate of flow of solids through the entire portion of the downflow path between the upper surface 32a of the compact bed and the engager 52a, and this decrease is greater in that sector (A) of the apparatus system in which the rate of flow through the lift conduit is changed. This results in a raising of the bed level in sector A to a greater extent than in the other sectors, and increases the uniformity of bed level throughout the various portions of the reactor cross section.

Simultaneously with the raising of the bed level 32a for example, the level 32b for example may be raised to an extent which, though less than the extent of raising of level 32a, is sufficient to actuate the apparatus associated with level detecting means 34b in order to open valve 38b and increase the rate of flow of solids through lift conduit 58b. Other changes in valve settings may also occur as a result of changes in bed level at various locations. Because each change in valve setting affects the bed level to a greater extent in the sector wherein the change occurs than in other sectors, each change brings the various levels 32a, 32b, etc., more nearly into line, and the net result is increased uniformity in bed level.

The remainder of the apparatus and operation illustrated in the drawing is conventional. The hydrocarbon conversion products are removed through suitable disengaging apparatus as known in the art, such apparatus therefore not being shown in the drawing (see for example E. V. Bergstrom U.S. Patent No. 2,458,498, issued January 11, 1949), and are then removed from vessel 10 through line 42. Steam for purging of the catalyst is introduced through line 44 through suitable known distributing means, such as those shown in the above patent, and the steam which has contacted the catalyst is removed together with conversion products through line 42.

Air for burning of carbonaceous deposits from the surface of the catalyst is introduced through line 46 and suitable known distributing means not shown and passes downwardly through regenerator 14. The flue gas and oxygen are removed through suitable known disengaging means through line 48. Distributing means for air in the regenerator can be generally similar to the disengaging means used in the reactor and regenerator.

The catalyst after passing downwardly by gravity as a compact mass through the reactor and regenerator portions of vessel 10 passes downwardly through the conduits 50 as compact masses into the engager vessels 52. Lifting fluid, for example flue gas, steam, air, etc., is introduced through conduits 56, engages the catalyst and carries it into the lift conduits 58. The lifting gas is separated from the catalyst in the disengager vessels 60 and is removed therefrom through line 62. The catalyst is then passed downwardly through the conduits 16 into reactor 12.

Any suitable means for changing the rate of flow of catalyst through a lift conduit 58 in response to a change in reactor bed level in the same sector can be employed. The various factors which control the rate of catalyst flow are well known in the art, and a change in any of these factors, responsive to a change in bed level, can be employed to change the lifting rate. The increase in pressure above the catalyst bed in the engager in a system as illustrated in the drawing is merely given as one example of a suitable manner of accomplishing this result.

In order to obtain the functions according to the invention, it is necessary that, in flowing through the portion of the downflow path between the upper bed level in the reactor and the conduits which convey the catalyst to the engager, the flowing catalyst stream or streams should be in a compact condition at all horizontal levels in that portion, since otherwise the effect of the change in the lifting rate is not satisfactorily transmitted to the reactor bed level. It is further necessary that in passing through this portion of the apparatus, any flow dividing means, which are employed in connection with introducing materials into contact with, or withdrawing materials from, the catalyst for example, be uniformly distributed among the sectors of the apparatus in which the corresponding lift conduits and falling catalyst streams are provided. It is conventional to provide such uniform distribution in such flow dividing means, and therefore this feature usually does not require any special construction. It is further necessary that in this portion of the apparatus, the overall cross-sectional area should not be excessively reduced. Thus, for example, at all levels within this portion of the apparatus, the diameter of the apparatus is preferably not less than one-tenth the maximum diameter in this portion. Also, if there is in this portion of the apparatus, any constriction to a diameter between one-tenth and one-half the maximum diameter, the length of the constriction is preferably not greater than five times its diameter. These features can readily be provided by a person skilled in the art from constructions which are known in the art of hydrocarbon conversion by contact with gravitating, compact, conversion-supporting solids.

In the apparatus shown in the drawing, the reactor and regenerator are integrated, with no seal leg between them. In cases where superimposed reactor and regenerator are employed, with a seal leg between, the above considerations with respect to dimensions are preferably observed, i.e. the seal leg preferably has diameter which is at least one-tenth the reactor diameter and at least one-tenth the regenerator diameter, and the length of the seal leg is preferably less than five times its diameter.

Although the invention has been described previously in relation to a system wherein a plurality of parallel falling streams of solids is employed, it can also be applied to a system employing a single falling stream, usually centrally located in the reactor. For various reasons, the upper level of the bed onto which the solids fall may vary in height in different parts of the reactor cross section, and the principle according to the invention can be employed, in a manner similar to that described previously, to counteract such variations and increase the uniformity of the bed level in the various portions of the reactor cross section; a plurality of level indicating means are provided, similarly to the manner previously described, in portions of the reactor cross section corresponding to the portions from which solids are withdrawn at the lower level. However, the invention is most effective as applied to a system wherein a plurality of parallel falling streams are employed.

The invention claimed is:

1. Process for converting hydrocarbons which comprises: passing granular conversion-supporting solids downwardly in free fall onto the upper surface of a compact moving bed of such solids; passing said solids downwardly in continuously compact condition to a lower level; withdrawing solids downwardly as a compact mass at said lower level in a plurality of streams in different portions of the cross section of said bed; elevating the solids thus withdrawn to a position above the falling solids; passing the solids downwardly again in free fall onto said upper surface; measuring the level of the upper surface of said bed in a plurality of locations spaced over the horizontal cross section of said bed; in response to changes in the level of the upper surface of said bed in portions of the cross section of said bed, changing the rate of withdrawal of solids downwardly in selected streams of said plurality of streams, thereby to counteract said changes in said level.

2. Apparatus for converting hydrocarbons which comprises: means for passing granular conversion-supporting solids downwardly in free fall onto the upper surface of a compact moving bed of such solids; means for passing said solids downwardly in continuously compact condition to a lower level; means for withdrawing solids downwardly as a compact mass at said lower level in a plurality of streams in different portions of the cross section of said bed; a plurality of lift conduits for elevation of the solids thus withdrawn to a position above the falling solids; means for passing the solids downwardly again in free fall onto said upper surface; a plurality of level detecting means beneath the falling solids, one such level detecting means being provided in each of said portions of the bed cross section; means responsive to a change in bed level, as determined by said level detecting means, and adapted to change the rate of withdrawal of solids downwardly from said bed in the same portion of the bed cross section as the level detecting means to which they are responsive, thereby to counteract said change in the bed level.

3. Process according to claim 1 wherein said solids are passed in said free fall as a plurality of streams spaced laterally from each other.

4. Apparatus according to claim 2 wherein a plurality of the first-named means are provided spaced over the horizontal cross section of the apparatus.

5. Process according to claim 1 wherein the solids are elevated by suspending them in a lifting gas in a plurality of lifting zones in parallel, and wherein said changing of the rate of withdrawal is accomplished by changing the rate of introduction of lifting gas into selected ones of said lifting zones responsively to said changes in level.

6. Apparatus according to claim 2 wherein said means responsive to a change in bed level comprise means for changing the rate of introduction of lifting gas into selected ones of said lift conduits.

References Cited in the file of this patent

UNITED STATES PATENTS

| | | |
|---|---|---|
| 2,446,986 | Simpson | Aug. 10, 1948 |
| 2,452,172 | Willard | Oct. 26, 1948 |
| 2,702,207 | Shirk | Feb. 15, 1955 |
| 2,739,994 | Bills | Mar. 27, 1956 |
| 2,770,583 | Haddad | Nov. 13, 1956 |
| 2,834,658 | Lieffers et al. | May 13, 1958 |